Patented July 29, 1941

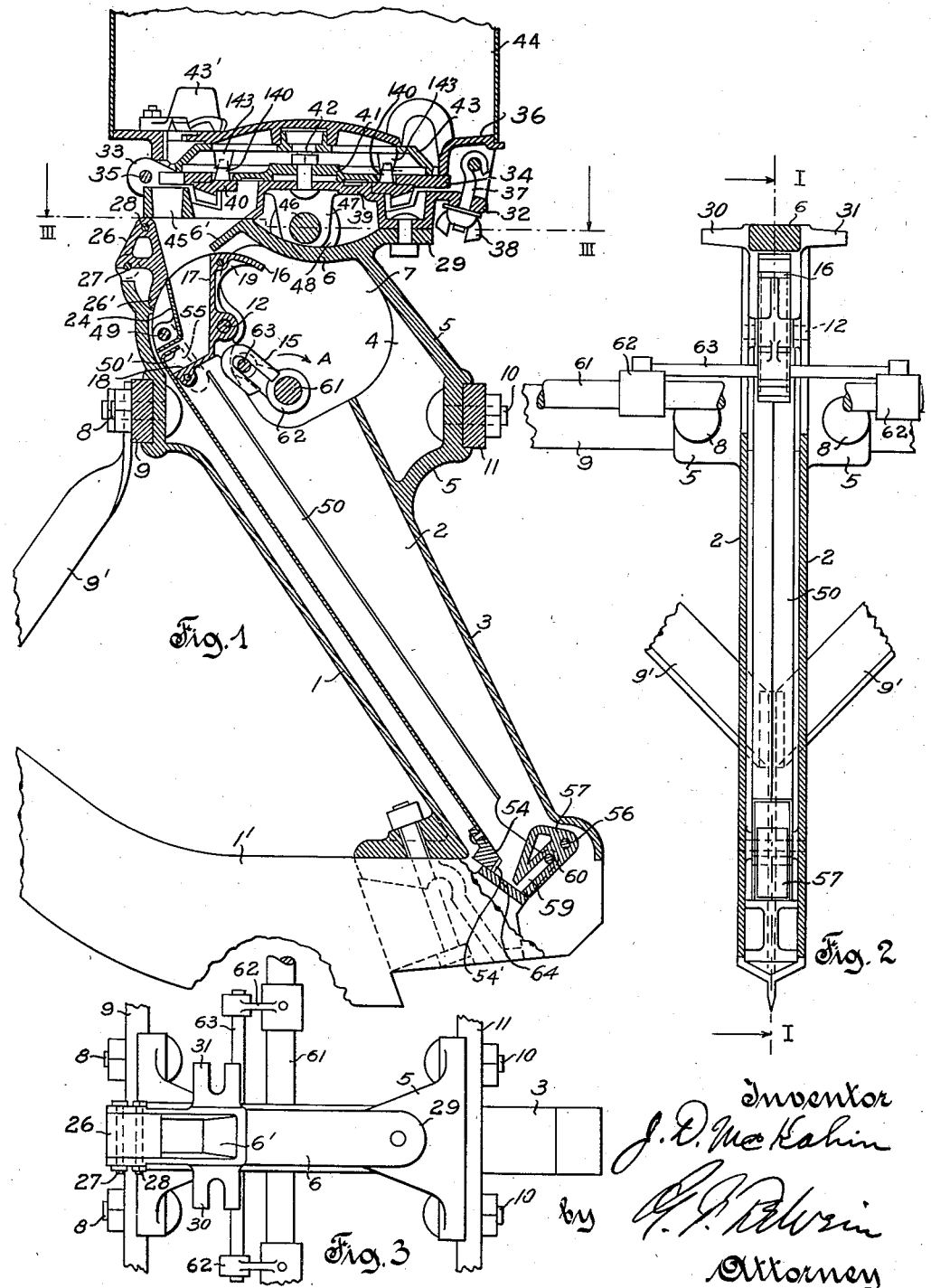

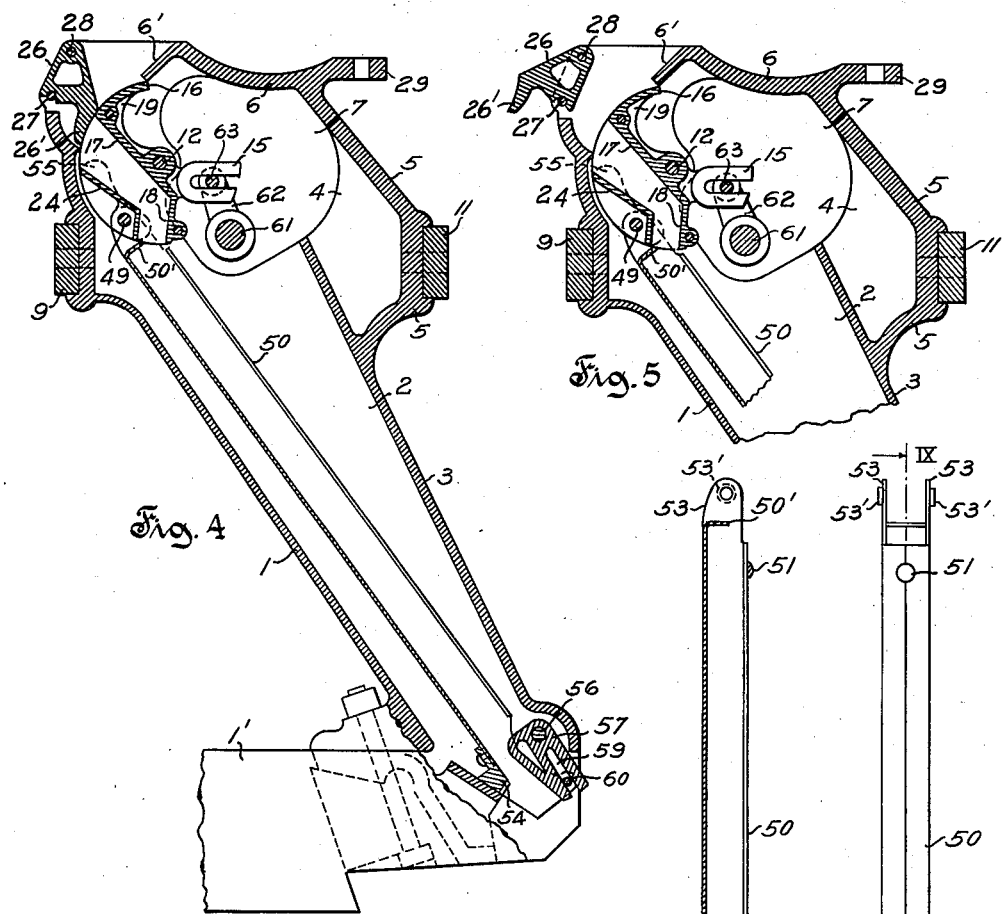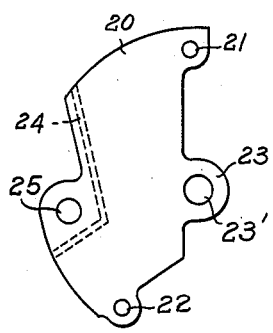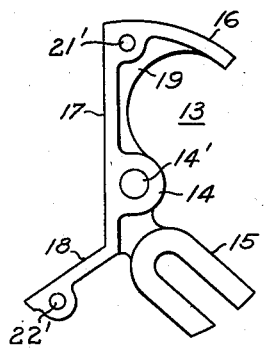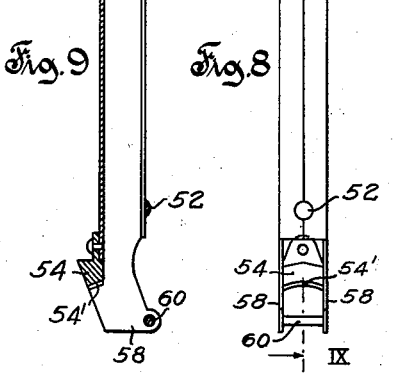

2,250,719

UNITED STATES PATENT OFFICE 2,250,719

PLANTER

John D. McKahin, La Crosse, Wis., assignor to Allis-Chalmers Manufacturing Company, Milwaukee, Wis., a corporation of Delaware Application April 1, 1939, Serial No. 265,421

25 Claims. (Cl. 111—51)

The invention relates to seed planters and it is concerned more specifically with an improved mechanism for depositing the seed into the soil.

It is an object of the invention to provide an improved mechanism for passing seed through the shank of a check-row planter, which mechanism will insure proper planting when the planter is drawn by a tractor at a relatively high rate of speed, a speed of four miles per hour being considered a relatively high speed for the operation of a planter.

More specifically, it is an object of the invention to provide an improved mechanism for passing seed through the shank of a check-row planter, which mechanism will reliably function when operated at high speed to deliver a predetermined number of seed kernels, such as corn, from the shank, and which will deposit such seed kernels into the ground in a "bunched" condition, that is, in close proximity to each other.

In order to accomplish the foregoing objects, the invention contemplates supplying the seed with an initial impulse at the upper end of the shank which impulse will be effective to shoot the seed down the shank, as distinguished from the usual practice heretofore used which relied only on the force of gravity to pass the seed from the upper to the lower portion of the shank. The invention further contemplates the use of a tube in place of the usual connecting rod between the upper and lower valves of the shank, the tube serving the double purpose of connecting the upper and lower valves with each other for simultaneous operation, and of guiding and maintaining the seed kernels in bunched condition during their movement from the upper to the lower valve. The invention further contemplates a reciprocable ejector at the lower end of the shank which not only functions to kick the seed kernels out of the shank towards the ground, but which, as it does so, also exerts a gathering or bunching effect upon the seed kernels, so that they will be deposited in the ground in close proximity to each other.

Another object of the invention is to provide an improved mechanism for accumulating and releasing seed kernels at the upper end of the shank.

A further object of the invention is to provide improved means for converting a check-row planter into a drill planter.

A further object of the invention is to provide an improved checking mechanism for coaction with a check wire, which mechanism has a low inertia against being set in motion and operates lightly so that undue stretching of the check wire and consequent irregularities of check will be avoided.

A still further object of the invention is to provide a seed depositing mechanism for check-row planters which is simple and compact in construction, efficient in operation, and which may be manufactured at low costs.

These and other objects and advantages of the invention will be apparent from the following description of a preferred embodiment of the invention shown in the drawings accompanying and forming part of this specification, and in which like reference characters designate the same or similar parts in the various views.

In the drawings:

Fig. 1 is a sectional side view of a planting unit of a check-row planter, the view being taken on line I—I of Fig. 2, and the seed depositing mechanism being shown in a seed arresting position;

Fig. 2 is a rear view of the planting unit shown in Fig. 1, the seed hopper being omitted and the rear portion of the shank being partly broken away to expose the valve mechanism and associated parts;

Fig. 3 is a top view of the planter shank, taken on line III—III of Fig. 1;

Fig. 4 is a view similar to Fig. 1, the seed hopper being omitted and the seed depositing mechanism being shown in a seed delivering position;

Fig. 5 is a sectional view of the upper part of the planter shank and enclosed mechanism with parts adjusted for operation of the planter as a drill planter;

Figs. 6 and 7 are detail views of the parts of the upper valve body; and

Figs. 8 and 9 are detail views of a push tube shown in Figs. 1 and 2, Fig. 9 being a section on line IX—IX of Fig. 8.

As shown in Figs. 1 and 2 the integrally cast hollow planter shank has a forward wall 1, side walls 2, and a rear wall 3. A web 4 extends in the central vertical plane of the shank rearwardly from the upper part of the rear wall 3 and has a marginal transverse flange 5 which merges at its upper end with a top portion 6 of the shank. The top portion 6 merges with the side walls 2, and the shank has a large opening 7 between the top 6 and the upper edge of the rear wall 3, the upper portions of the side walls 2 being recessed as shown in Fig. 1, to form the opening 7. The shank is supported on the usual runner frame, bolts 8 connecting the shank with the forward transverse bar 9 of the runner frame, and a pair of bolts 10 connecting the shank with the rearward transverse bar 11 of the runner frame. A furrow opener 1' is secured to the lower end of the shank, and diverging braces 9' extend between the tip of the furrow opener and the frame bar 9.

Pivotally mounted between the upper portions of the side walls 2 of the shank by means of a pivot pin 12 is an upper valve body which is shown more clearly in Figs. 6 and 7. The upper valve body is made in two parts, one being a casting 13 shown in Fig. 6 and the other being a sheet metal structure shown in Fig. 7.

The casting 13 has a hub portion 14, a forked extension 15, a curved tail plate 16, an upper face plate 17 and a lower face plate 18, the face plates being disposed at an obtuse angle relative to each other as shown in Fig. 6. A web 19 extends rearwardly from the face plate 17 between the tail plate 16 and the hub 14. The sheet metal part of the upper valve body shown in Fig. 7 comprises two side plates 20 which, when the valve body is assembled, are riveted to the casting 13, rivet holes 21 and 22 being provided to register with rivet holes 21' and 22' in the casting 13. The side plates 20 also have hub extensions 23 overlying the hub portion 14 of the casting when the valve body is assembled, the bore 14' of the hub portion 14 registering with a hole 23' of each side plate. The side plates 20 of the upper valve body are rigidly connected by a transverse plate member 24 of angular formation as shown in Fig. 7. The casting 13 and the sheet metal part comprising the side plates 20 and transverse plate member 24 are held in assembled position as shown in Fig. 1, by rivets extending through the holes 21, 21' and 22, 22', respectively. It will be noted that the assembled valve body forms a receptacle with an inlet opening at the outer end of the upper face plate 17 and an outlet opening at the outer end of the lower face plate 18, the inlet and outlet openings being spaced from each other circumferentially about the axis of the pin 12 which axis is also the pivot axis of the receptacle formed by the upper valve body. It will also be noted that the plate member 24 and the face plates 17 and 18 of the casting 13 form a substantially L-shaped seed passage when the sheet metal parts and the casting are assembled as shown in Fig 1. The side plates 20 of the upper valve body project forwardly beyond the transverse plate member 24 and are each provided with a hole 25 for the reception of a pivot pin to be described later.

In the position of the upper valve body as shown in Fig. 1, the upper or inlet end of the seed passage registers with an opening in the upper part of the shank between a forwardly slanting wall portion 6' and a filler block 26 secured to the planter shank between the upper portions of the side walls 2 by means of bolts 27 and 28

The upper portion 6 of the shank has a rearwardly extending mounting lug 29 and a pair of forward mounting lugs 30 and 31 extending laterally from the upper portions of the side walls 2. Secured to the mounting lugs 29, 30 and 31 is a base plate 32 having hinge lugs 33 on which a false ring 34 is pivotally mounted by means of a hinge pin 35. Also hinged to the base 32 by means of the hinge pin 35 is the bottom 36 of a seed can 44, a hook bolt 37 having a wing nut 38 serving to secure the bottom 36 to the base 32 against pivotal movement about the hinge pin 35. Rotatably mounted on a hub portion 39 of the base 32 is a ring gear 40 having upstanding lugs 140, and a retainer plate 41 secured to the hub portion 39 by means of a bolt 42 holds the ring gear 40 in axially fixed position on the hub 39. A rotatable seed plate 43 rides on the false ring 34 and has a pair of downwardly projecting lugs 143 which are drivingly engaged by upstanding lugs 140 of the ring gear 40. The seed plate 43 has peripheral pockets which, when the seed plate is rotated by the ring gear 40, move over a passage 45 of the base 32, and seed kernels within the pockets will be successively dropped into the passage 45 by rotation of the seed plate. A suitable device of conventional construction for assisting delivery of the kernels from the pockets into the passage 45 is indicated at 43'. A seeder shaft 46 is journaled in a bearing lug 47 of the base 32 and carries a bevel gear 48 which meshes with bevel teeth of the ring gear 40. The mechanism for feeding seed from the seed can 44 to the passage 45 of the base 32 oprates in conformity with established principles known in the art and a further description thereof is therefore believed unnecessary.

Pivotally secured to the upper valve body by means of a pivot pin 49 extending through the holes 25 of the side plates 20 thereof is a push tube 50 which extends longitudinally of the shank in the space between the front, side and rear walls thereof. The push tube 50 is shown in detail in Figs. 8 and 9 and is made of sheet metal as may be seen from these figures. A suitable sheet metal stamping is bent over a square core and the adjacent edges of the stamping are connected together by welding as indicated at 51 and 52 in Figs. 8 and 9. The upper portion of the push member 50 has a pair of tongues 53 which straddle the upper valve body and are provided with suitable bushings 53' for the reception of the pivot pin 49. The side walls 2 of the shank are apertured as indicated at 55 to permit insertion and removal of the pivot pin 49. The forward wall of the push tube 50 adjacent to the forward wall 1 of the shank extends upwardly somewhat higher than the opposite wall of the push tube 50, and the upper portion of the forward wall of the push tube is bent over to form an inwardly extending lip 50' on the forward wall of the push tube 50. In the position of the parts as shown in Fig. 1, the lip 50' extends into the lower end of the seed passage of the upper valve at a distance from the lower face plate 18, and the forward wall of the push tube 50 between the lip 50' and the lower face plate 18 extends across the discharge opening of the seed passage of the valve in close proximity to the valve body, whereby the tube and valve body cooperate to form a pocket in which seed delivered into the seed passage of the valve may accumulate.

Riveted to the lower end of the push tube 50 is an ejector block 54 which is slidable in a rearward and downward direction on a rearwardly and downwardly inclined wall portion 64 of the shank 1 as shown in Fig. 1. The ejector block supports the lower end of the push tube 50 on the shank for movement longitudinally thereof.

Pivotally mounted in the lower end of the shank by means of a pivot pin 56 is a lower valve body 57 which is straddled by lower tongues 58 of the push tube 50. Lower valve body 57 has a radial slot 59 for the reception of a coupling pin 60 extending between and secured to the lower tongues 58 of the push tube 50. The rear wall of the push tube opposite to the ejector block 54 is cut away and the lower tongues 58 are suitably recessed in order to permit relative movement of the push tube and valve body 57 into the position in which these parts are shown in Fig. 4 and in which position the lower valve body is open. The rear wall of the push tube opposite the ejector block 54 is cut away to accommodate a raised portion of the valve body 57 which provides an inclined face against which the seed is thrown from the interior of the push tube 50 when the parts are in the position shown in Fig. 1, the inclined surface of the valve member 57 directing such seed towards the forward wall of the shank, where it accumulates between the ejector block 54 and the valve body 57. A reentrant ejector face 54' at the seed expelling end of the ejector block 54 extends at substantially right angles to the wall portion 64 of the shank 1, the ejector face 54', as best shown in Fig. 8, being concave or in other words composed of relatively converging surface portions which form a cavity for expelling engagement with seed kernels to be ejected from the shank. The particular shape of the seed engaging end face of the ejector block 54 produces a gathering effect upon any scattered seed accumulated in front thereof, when the tube 50 is pushed downwardly in order to eject the seed from the shank.

A rocker shaft 61 shown in Figs. 1 and 2 extends through the opening 7 of the shank and carries a pair of arms 62 at opposite sides of the shank. A rod 63 is mounted on the outer ends of the arms 62 and engages the forked portion 15 of the upper valve. It will be seen that rocking movement of the rocker shaft 61 in the direction of arrow A in Fig. 1 will move the upper valve body from the position in which it is shown in Fig. 1 into the position in which it is shown in Fig. 4, and that rocking movement of the rocker shaft 61 in the opposite direction will move the upper valve body from the position in which it is shown in Fig. 4 into the position in which it is shown in Fig. 1. Such rocking movement will alternately open and close the seed receiving opening of the shank between the top wall 6' and the filler block 26 when the latter is adjusted to the position in which it is shown in Figs. 1 and 4. The mentioned oscillating movement of the upper valve body is transmitted to the lower valve body 57 through the push tube 50 and it will be noted that movement of the upper valve body from the position of Fig. 1 into the position of Fig. 4 causes the upper portion of the forward wall of the push tube 50 to recede from the upper valve body so as to open the discharge end of the seed passage through the upper valve body, while the lip 50' moves in a generally downward direction together with the push tube 50. While the push tube 50 moves from the position of Fig. 1 into the position of Fig. 4, the coupling pin 60 in the lower end of the tube pushes the lower valve body 57 into its open position as shown in Fig. 4, the coupling pin 60 sliding within the radial slot 59 during such movement. The ejector block 54 sliding on a machined forward wall portion at the lower end of the shank guides the lower end of the tube during up and down movements imparted thereto by oscillation of the upper valve body. The lower end of the tube 50 is guided between the side walls 2 of the shank as may be seen from Fig. 2.

In the operation of the machine as a check-row planter the filler block 26 is adjusted to the position shown in Fig. 1 and the rocker shaft 61 is oscillated back and forth in the mentioned manner by the usual check fork and spring, the check fork cooperating with the buttons of the check wire to move the rocker shaft in the direction of arrow A in Fig. 1, and the spring moving the rocker shaft in the opposite direction every time the check fork has cleared a button of the check wire. A more detailed description of the actuating mechanism for the rocker shaft is believed unnecessary as such mechanisms are well known in the art. The rocker shaft 61 is also connected with a suitable power transmitting mechanism of the type generally used in check-row planters and which is controlled by rocking movement of the rocker shaft in the direction of arrow A in Fig. 1 to establish a driving connection between the seeder shaft 46 and a suitable source of power. This driving connection, as is well known in the art, continues for a certain length of time and is then automatically interrupted, the oscillating movement of the rocker shaft merely functioning to establish the driving connection but not to interrupt it. Consequently an operating cycle of the mechanism will consist first of a quick oscillating movement of the upper valve body from the position shown in Fig. 1 to the position shown in Fig. 4 and back into the position shown in Fig. 1; and second, of a rotation of the seed plate 43 which will start simultaneously with the actuation of the upper valve body but continue for a certain period after the upper valve body has returned into the position in which it is shown in Fig. 1. Rotation of the seed plate 43 will feed a predetermined number of seed kernels from the seed can 44 through the passage 45 into the upper portion of the shank. In the initial stage of the operating cycle the opening between the shank wall 6' and the filler block 26 is closed by the tail plate 16 of the upper valve body. The first seed kernels coming through the passage 45 will therefore be intercepted by the tail plate 16 which occupies the position shown in Fig. 4. As soon as the valve body moves into the position shown in Fig. 1, the intercepted seed kernels will fall into the seed passage of the valve body and accumulate on the lower face plate 18 and below the lip 50' of the push tube 50. As long as the seed plate continues feeding kernels to the passage 45, such kernels will accumulate in the lower part of the upper valve body in the manner just described, but the predetermined number of seed kernels will be counted out by the seed plate in a shorter time than the time between two successive actuations of the rocker shaft by the buttons of the check wire. After the predetermined number of seed kernels have been delivered from the seed can 44 into the seed passage of the upper valve body, they are retained therein until the beginning of a new operating cycle. Such cycle, as stated, starts with a quick back and forth movement of the upper valve body and it will be seen that any seed accumulated in the seed passage of the upper valve will be dropped by the first movement of the upper valve body into the push tube 50. When the planter is propelled at a relatively high speed, the downward movement of the push tube 50 due to the first movement of the upper valve body is very rapid and the lower face plate 18 will move away from the kernels which, under the force of gravity, start their downward movement at a slower rate of speed than the speed with which the lower face plate 18 moves in a downward direction during forward oscillation of the upper valve body. In other words, the downward acceleration of the lip 50' will be greater than the gravitational acceleration of the kernels, and the lip 50' will therefore come in contact with the kernels and supply them with an impulse in a downward direction, and in this manner the kernels will be forcibly moved down the push tube 50 and not merely slide down under the force of gravity alone. The function of the lip 50' therefore is that of an impelling means or impeller for accelerating downward movement of the seed. After the upper valve body has been emptied, it returns into the position shown in Fig. 1 and receives a new charge of kernels as has been explained hereinbefore. The kernels shooting down the push tube 50 will be intercepted by the lower valve body 57 which moves into closed position before the kernels reach the lower end of the push tube. As mentioned before, the kernels will strike the upper inclined surface of the lower valve body 57 and accumulate in the space between the ejector 54 and the lower valve body 57. With the beginning of the next operating cycle, the push tube 50 will again move downwardly with a quick stroke and the seed kernels accumulated in front of the ejector 54 will be engaged by the concave face 54' of the ejector member and be thrown out of the shank with a shooting action due to the downward movement of the push tube 50. The ejector 54 therefore also acts as an impeller, and as the kernels in front of the ejector 54 are being accelerated, they are also gathered or bunched due to the concave formation of the ejector face 54', and the entire number of kernels will therefore be disposed in close proximity to each other in the ground.

It should also be noted that the kernels shooting down the push tube 50 have very little opportunity to spread transversely of the tube and the tube therefore serves to keep the kernels in a bunched condition while they pass from the upper to the lower valve body. The entire charge of kernels will arrive at the lower body substantially at the same time and the lower valve body may therefore be operated in rapid succession and at each time the entire predetermined number of kernels will be discharged from the shank.

Fig. 5 shows the upper valve body and the filler block 26 adjusted for operation of the machine as a drill planter. When operating the machine as a drill planter, the rocker shaft 61 is locked by suitable means in the position in which it is shown in Fig. 5 and in this position the upper valve body occupies a position in which its seed passage communicates with the interior of the push tube 50. Since the upper valve body does not oscillate when the machine is operated as a drill planter, provision must be made to permit passage of seed from the seed can into the seed passage of the upper valve body and this is accomplished by mounting the filler block 26 in a reversed position as shown in Fig. 5. In this position of the filler block the passage between the shank wall 6' and the filler block, as shown in Fig. 5, is substantially wider than the passage between the wall 6' and the filler block shown in Fig. 4, and it will be noted that the tail plate 16 of the upper valve body only partly covers the wider passage leaving sufficient room for the entry of seed into the upper valve body. The filler block 26 is of substantially triangular shape as shown and has a wing portion 26', the purpose of this wing portion being to cover the inlet end of the seed passage of the upper valve body when the parts are adjusted to the positions shown in Fig. 4. The covering of the upper end of the seed passage of the upper valve body has been found desirable in order to prevent the escape of seeds from the upper valve body in an upward direction when the upper valve body is moved very rapidly from the position of Fig. 1 into the position of Fig. 4.

It should be understood that it is not desired to limit the invention to the exact details of construction herein shown and described for various modifications within the scope of the appended claims may occur to persons skilled in the art.

It is claimed and desired to secure by Letters Patent:

1. In a planter, a shank, a valve element movably mounted on said shank, a control element movably connected with said valve element for actuation thereby and cooperation therewith to form a seed-receiving pocket for the accumulation of seed and to effect release of accumulated seed from said pocket, and an impeller member connected with said control element adapted to engage seed released from said pocket and to accelerate such seed by movement of said control element.

2. In a planter, a shank, an upper valve element movably mounted on an upper portion of said shank, a control element connected with said upper valve element for actuation thereby and cooperation therewith to from a seed-receiving pocket for the accumulation of seed and to effect release of accumulated seed from said pocket, a lower valve element movably mounted on a lower portion of said shank and operatively connected with said control element to intercept and release seed dropped from said pocket, and an impeller member connected with said control element adapted to engage seed dropping from said pocket and to accelerate such seed toward said lower valve element by movement of said control element.

3. In a planter, a shank, an upper valve element movably mounted on an upper portion of said shank, a control element connected with said upper valve element for actuation thereby and cooperation therewith to form a seed-receiving pocket for the accumulation of seed and to effect release of accumulated seed from said pocket, a lower valve element movably mounted on a lower portion of said shank and operatively connected with said control element to intercept and release seed dropped from said pocket, an impeller member connected with said control element adapted to engage seed dropping from said pocket and to accelerate such seed toward said lower valve element by movement of said control element, and wall elements connected with said control element forming a conduit for seed moving from said pocket toward said lower valve element.

4. In a planter, a shank, an upper valve element movably mounted on an upper portion of said shank, a control element connected with said upper valve element for actuation thereby and cooperation therewith to form a seed-receiving pocket for the accumulation of seed and to effect release of accumulated seed from said pocket, a lower valve element movably mounted on a lower portion of said shank and operatively connected with said control element to intercept and release seed dropped from said pocket, an upper impeller member connected with said control element adapted to engage seed dropping from said pocket, and a lower impeller member connected with said control element adapted to engage seed released by said lower valve member.

5. In a planter, a shank, an upper valve element movably mounted on an upper portion of said shank, a control element connected with said upper valve element for actuation thereby and cooperation therewith to form a seed-receiving pocket for the accumulation of seed and to effect release of accumulated seed from said pocket, a lower valve element movably mounted on a lower portion of said shank and operatively connected with said control element to intercept and release seed dropped from said pocket, an upper impeller member connected with said control element adapted to engage seed dropping from said pocket, a lower impeller member connected with said control element adapted to engage seed released by said lower valve member, and wall elements connected with said control element forming a conduit for seed passing from said upper toward said lower valve element.

6. In a planter, a shank, an upper and a lower valve element movably mounted, respectively, on upper and lower portions of said shank, a control element connected with said upper valve element for actuation thereby and cooperation therewith to form a seed-receiving pocket for the accumulation of seed and to effect release of accumulated seed from said pocket, and means operatively connecting said control element with said lower valve element for actuation of the latter by said control element.

7. In a planter, a shank, an upper and a lower valve element movably mounted, respectively, on upper and lower portions of said shank, a control element connected with said upper valve element for actuation thereby and cooperation therewith to form a seed-receiving pocket for the accumulation of seed and to effect release of accumulated seed from said pocket, means operatively connecting said control element with said lower valve element for actuation of the latter by said control element, and wall members connected with said control element forming a conduit for seed passing from said upper to said lower valve element.

8. In a planter, a shank, an upper and a lower seed control member movably mounted on upper and lower portions, respectively, of said shank, and means for transmitting movement from one of said seed control members to the other including a hollow member operatively connecting said seed control members and arranged to receive seed from said upper control member and to deliver such seed to said lower control member.

9. In a planter, a shank, a valve body pivotally mounted on said shank, an element supported on said shank for reciprocating movement longitudinally thereof, means connecting said valve body with said element for reciprocating the latter by pivotal movement of said valve body, and a wall member rigidly connected with said element and adapted to cooperate with said valve body in a predetermined position of the latter to close a seed passage through said valve body and to open said seed passage by pivotal movement of said valve body.

10. In a planter, a shank having a seed receiving aperture, a valve body mounted on said shank for pivotal movement to open and close said aperture, said valve body having a seed passage communicating at one of its ends with said aperture in the open position of said valve, an element supported on said shank for reciprocating movement longitudinally thereof, means connecting said valve body with said element for reciprocating the latter by pivotal movement of said valve body, and a wall member rigidly connected with said element and cooperating with said valve body in the open position of the latter to close said seed passage at its other end, and to open said seed passage at said other end in the closed position of said valve body.

11. In a planter, a shank having a seed receiving aperture, a valve body mounted on said shank for pivotal movement to open and close said aperture, said valve body having a seed passage communicating at one of its ends with said aperture in the open position of said valve, an element supported on said shank for reciprocating movement longitudinally thereof, means connecting said valve body with said element for reciprocating the latter by pivotal movement of said valve body, and a wall member rigidly connected with said element and cooperating with said valve body in the open position of the latter to close said seed passage at its other end, and to open said seed passage at said other end in the closed position of said valve body, said wall member having a seed impelling portion adapted to engage seed released from said seed passage and to accelerate such seed along said shank by movement of said element.

12. In a planter, a shank, an upper valve body pivotally movable on said shank into a first and a second position, a tube supported on said shank for reciprocating up and down movement relative thereto, means connecting said valve body with said tube for reciprocating the latter by pivotal movement of said valve body, said valve body having a seed passage and said tube having a wall member cooperating with said valve body in said first position thereof to close said seed passage, while said seed passage in said second position of said valve body communicates with the interior of said tube, and a swingably mounted lower valve body in alinement with said tube and operably connected therewith to be swung from a closed into an open position simultaneously with movement of said upper valve body from its first into its second position.

13. In a planter, a hollow shank, a pivoted upper valve body mounted on said shank having a seed passage therethrough, a tube within said shank pivotally connected with said upper valve body and reciprocable by pivotal movement of said upper valve body, said tube being adapted to receive bunched seed from said seed passage and to convey such seed in bunched condition to the lower end of said shank, a pivoted lower valve body mounted on said shank near the lower end of said tube, and means operatively connecting said tube with said lower valve body to oscillate the latter by reciprocating movement of said tube due to pivotal movement of said upper valve body.

14. In a planter, a hollow shank, a pivoted upper valve body mounted on said shank having a seed passage therethrough, a tube within said shank pivotally connected with said upper valve body and reciprocable by pivotal movement of said upper valve body, said tube being adapted to receive bunched seed from said seed passage and to convey such seed in bunched condition to the lower end of said shank, a pivoted lower valve body mounted on said shank near the lower end of said tube, means operatively connecting said tube with said lower valve body to oscillate the latter by reciprocating movement of said tube due to pivotal movement of said upper valve, and an element movable with said tube relative to said upper valve body so as to obstruct the discharge opening of said seed passage by movement of said upper valve body in one direction, and so as to clear said discharge opening by movement of said upper valve body in the opposite direction.

15. In a planter, a hollow shank, a filler block adapted to be secured in an apertured wall portion of said shank in relatively reversed first and second positions respectively affording a narrow and a wide passage between said filler block and an opposite wall portion of said shank, and a valve body mounted in said shank for movement transversely of said passage, said valve body being adapted, in a predetermined position thereof, to close said passage when said filler block is mounted in its first position, and said valve body, in said predetermined position thereof, being insufficient to close said passage when said filler block is mounted in its second position whereby said passage is partly uncovered.

16. In a planter, a shank, means including a valve element pivotally mounted on said shank for controlling the passage of seed through an upper portion of said shank, a reciprocable element pivotally connected with said valve element and guided for movement longitudinally of said shank, means connected with and operable by said reciprocable element for controlling the passage of seed through a lower portion of said shank, and an impeller member connected with said reciprocable element adapted to engage and accelerate seed passing from said upper to said lower portion of said shank.

17. In a planter, a shank, means including a valve element pivotally mounted on said shank for controlling the passage of seed through an upper portion of said shank, a reciprocable element pivotally connected with said valve element and guided for movement longitudinally of said shank, means connected with and operable by said reciprocable element for controlling the passage of seed through a lower portion of said shank, an upper impeller member connected with said reciprocable element adapted to engage and accelerate seed passing from said upper to said lower portion of said shank, and a lower impeller member connected with said reciprocable element adapted to eject seed from said shank through said lower portion thereof.

18. In a planter, a shank and means for controlling the passage of seed from an upper to a lower portion of said shank, said means comprising a receptacle pivoted on an upper portion of said shank and having an inlet and an outlet opening spaced from each other circumferentially about the pivot axis of said receptacle, a tube element for conducting seed from said outlet opening to a lower portion of said shank, said tube element being pivotally connected with said receptacle and movable downwardly relative to said shank by pivotal movement of said receptacle from a first into a second position, a wall member connected with said tube element and cooperating with said receptacle, in said first position thereof, to close said outlet opening and to open said outlet opening by movement of said receptacle from said first into said second position, and a lip on said wall element projecting into said outlet opening in said first position of said receptacle, whereby seed discharged from said outlet opening during movement of said receptacle from said first into said second position may be engaged by said lip and accelerated in a downward direction due to rapid downward movement of said tube element.

19. In a planter, a shank, means including a valve element pivotally mounted on said shank for controlling the passage of seed through an upper portion of said shank, a control element operatively connected with said valve element for reciprocating movement relative to said shank in the longitudinal direction of the latter, and an impeller member connected, at said upper portion of said shank, with one of said elements and adapted to accelerate seed released by said valve element in a downward direction longitudinally of said shank.

20. In a planter, a shank, means including a valve element pivotally mounted on said shank for controlling the passage of seed through an upper portion of said shank, a control element operatively connected with said valve element for reciprocating movement relative to said shank in the longitudinal direction of the latter, an impeller member connected, at said upper portion of said shank, with one of said elements and adapted to accelerate seed released by said valve element in a downward direction, and means including a movable element operatively connected with said control element for controlling the passage of said accelerated seed through a lower portion of said shank.

21. In a planter, a shank and means for controlling the passage of seed through said shank, said means comprising a valve member pivotally movable from a first into a second position, and vice versa, and a tubular member operatively connected with said valve member for endwise reciprocating movement relative to said shank, said tubular member having a seed receiving opening adjacent to said valve member, and said valve member having a portion extending over said seed receiving opening of said tubular member in said first position thereof, whereby said seed receiving opening of said tubular member will be closed for the passage of seed from said valve member into said tubular member in said first position of said valve member, and whereby said seed receiving opening of said tubular member will be open for the passage of seed from said valve member into said tubular member in said second position of said valve member.

22. In a planter, a shank and means for controlling the passage of seed through said shank, said means comprising a pivoted valve member having a face plate movable therewith from a first into a second position and vice versa, a tubular member operatively connected with said valve member for endwise reciprocating movement relative to said shank and having a seed receiving opening adjacent to said valve member, and a wall element on said tubular member cooperating with said face plate in said first position of the latter to arrest seed falling upon said face plate, and to release seed accumulated on said face plate into said seed receiving opening of said tubular member by movement of said face plate from said first into said second position thereof.

23. In a planter, a shank and means for controlling the passage of seed through said shank, said means comprising a pivoted valve member having a face plate movable therewith from a first into a second position and vice versa, a tubular member operatively connected with said valve member for endwise reciprocating movement relative to said shank and having a seed receiving opening adjacent to said valve member, means cooperating with said face plate to form a pocket for the accumulation of seed on said face plate in said first position of the latter and to release said seed from said pocket into said tubular member through said seed receiving opening of the latter by movement of said face plate from said first into said second position, and a lip connected with said tubular member and extending transversely thereof adjacent to said valve member, said face plate in said first position thereof projecting under said lip at a distance therefrom sufficient to provide a space for said accumulation of seed on said face plate below said lip.

24. In a planter, a shank and means for controlling the passage of seed through said shank, said means comprising a pivoted valve member having a face plate movable therewith from a first into a second position and vice versa, a tubular member operatively connected with said valve member for endwise reciprocating movement relative to said shank and having a seed receiving opening adjacent to said valve member, means including a longitudinal wall extension of said tubular member adjacent to said valve member, cooperating with said face plate to form a pocket for the accumulation of seed on said face plate in said first position of the latter and to release seed from said pocket into said tubular member through said seed receiving opening of the latter by movement of said face plate from said first into said second position, and a lip on said wall extension extending transversely of said tubular member, said face plate in said first position thereof projecting under said lip at a distance therefrom sufficient to provide a space for said accumulation of seed on said face plate below said lip.

25. In a planter, a shank and means for controlling the passage of seed through said shank, said means comprising a valve member pivoted on an axis in fixed relation to said shank, a tubular member adapted to receive seed released by said valve member and reciprocable endwise relative to said shank, and means pivotally connecting said tubular member with said valve member on an axis radially spaced from said pivot axis of said valve member.

JOHN D. McKAHIN.

CERTIFICATE OF CORRECTION.

Patent No. 2,250,719. July 29, 1941.

JOHN D. McKAHIN.

It is hereby certified that error appears in the printed specification of the above numbered patent requiring correction as follows: Page 4, second column, line 32, claim 2, for "from" read --form--; page 6, first column, line 22, claim 15, after the syllable "tion" insert a comma; and that the said Letters Patent should be read with this correction therein that the same may conform to the record of the case in the Patent Office.

Signed and sealed this 23rd day of September, A. D. 1941.

(Seal)

Henry Van Arsdale,
Acting Commissioner of Patents.